(12) United States Patent
Chang et al.

(10) Patent No.: US 11,847,080 B2
(45) Date of Patent: Dec. 19, 2023

(54) ALL-IN-ONE COMPUTERS WITH POWER DELIVERY CONTROLLERS

(71) Applicant: Hewlett-Packard Development Company, L.P., Spring, TX (US)

(72) Inventors: Jui-Hsuan Chang, Taipei (TW); Chia-Ching Lu, Taipei (TW); Shih-Chieh Liu, Taipei (TW); Nam Hoang Nguyen, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/919,628

(22) PCT Filed: Apr. 30, 2020

(86) PCT No.: PCT/US2020/030687
§ 371 (c)(1),
(2) Date: Oct. 18, 2022

(87) PCT Pub. No.: WO2021/221654
PCT Pub. Date: Nov. 4, 2021

(65) Prior Publication Data
US 2023/0153257 A1 May 18, 2023

(51) Int. Cl.
*G06F 13/38* (2006.01)
*G06F 1/16* (2006.01)

(52) U.S. Cl.
CPC .......... *G06F 13/382* (2013.01); *G06F 1/1601* (2013.01); *G06F 2213/0042* (2013.01); *G06F 2213/3812* (2013.01)

(58) Field of Classification Search
CPC ......... G06F 2213/3812; G06F 2213/40; G06F 2213/4002; G06F 2213/4004; G06F 13/382; G06F 13/385; G06F 13/387
See application file for complete search history.

(56) References Cited

U.S. PATENT DOCUMENTS

| 7,953,910 B2 | 5/2011 | Kakish |
| 8,792,656 B2 | 7/2014 | He et al. |
| 9,912,899 B2 | 3/2018 | Cox et al. |

(Continued)

FOREIGN PATENT DOCUMENTS

WO 2016/176219 A1 11/2016

OTHER PUBLICATIONS

Dell, "Dell 27 USB-C Monitor_ P2719HC," Dell Corporation Ltd., retrieved from: https://www.dell.com/en-us/work/shop/accessories/apd/210-aqcq, retrieved at: Mar. 28, 2020, pp. 11.

*Primary Examiner* — Raymond N Phan
(74) *Attorney, Agent, or Firm* — Quarles & Brady LLP (57) ABSTRACT

An all-in-one computer includes a display, a Universal Serial Bus (USB) Type-C port, a plurality of USB Type-A ports, a USB hub, a demultiplexer, and a Power Delivery (PD) controller. The USB hub is coupled to the plurality of USB Type-A ports. The demultiplexer is coupled between the display, the USB Type-C port, and the USB hub. The PD controller is to control the demultiplexer and the USB hub to pass a display signal input to the USB Type-C port to the display and pass signals input to the USB hub from the plurality of USB Type-A ports to the USB Type-C port with a computing device coupled to the USB Type-C port.

12 Claims, 5 Drawing Sheets

(56) References Cited

U.S. PATENT DOCUMENTS

| | | | |
|---|---|---|---|
| 10,234,910 B2 | 3/2019 | Halim et al. | |
| 10,574,070 B1* | 2/2020 | Li | G06F 13/4282 |
| 2016/0085272 A1 | 3/2016 | Chien et al. | |
| 2016/0378971 A1* | 12/2016 | Dunstan | G06F 21/44 |
| | | | 726/17 |
| 2017/0192924 A1* | 7/2017 | Chiba | G06F 13/4282 |
| 2019/0065423 A1 | 2/2019 | Kadgi et al. | |
| 2019/0378971 A1 | 12/2019 | Chu et al. | |
| 2020/0233822 A1* | 7/2020 | Zheng | G06F 3/1407 |
| 2020/0326955 A1* | 10/2020 | Adiletta | G06F 1/1684 |
| 2021/0365400 A1* | 11/2021 | Hsu | G06F 13/4295 |
| 2022/0030191 A1* | 1/2022 | Chen | H04N 21/4622 |

\* cited by examiner

ALL-IN-ONE COMPUTERS WITH POWER DELIVERY CONTROLLERS

BACKGROUND

An All-In-One (AIO) computer integrates the computer's internal components (e.g., central processing unit, memory, etc.) into the same case as the display. An AIO computer may include Universal Serial Bus (USB) ports to connect a keyboard, mouse, and/or other input/output devices to the AIO computer.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An All-In-One (AIO) computer may include a Universal Serial Bus (USB) Type-C input port to provide video in to extend and/or clone an external host display for an external host coupled to the USB Type-C input port. An AIO computer may also include USB Type-A ports to connect a keyboard, mouse, and/or other input/output devices to the AIO computer. The USB Type-A ports, however, may not be available to an external host coupled to the USB Type-C input port. In addition, the life of the display of an AIO computer and peripheral devices, such as a keyboard, mouse, and/or other input/output devices used with the AIO computer may be longer than the life of the processing components (e.g., central processing unit, memory, etc.) of the AIO computer. Replacing the entire AIO computer once the processing components have reached their end of life while the display and peripheral devices may still have some remaining life may be cost prohibitive. In addition, by enabling the display and peripheral devices of an AIO computer to be utilized by an external host, the versatility of the AIO computer is improved. Accordingly, disclosed herein is an AIO computer where the display and the USB Type-A ports of the AIO computer may be shared by an external host.

The AIO computers disclosed herein include a display, a USB Type-C port, and USB Type-A ports. When a computing device, such as a notebook computer, tablet, or cellular phone is connected to the USB Type-C port, the display of the AIO computer may be used as a display for the computing device and the USB Type-A ports may be used as USB ports for the computing device. Therefore, a keyboard, mouse and/or other input/output devices connected to the USB Type-A ports of the AIO computer may be used as input/output devices of the computing device connected to the USB Type-C port. When a computing device is not connected to the USB Type-C port, the USB Type-C port may act as a USB input/output port.

Figure 1:
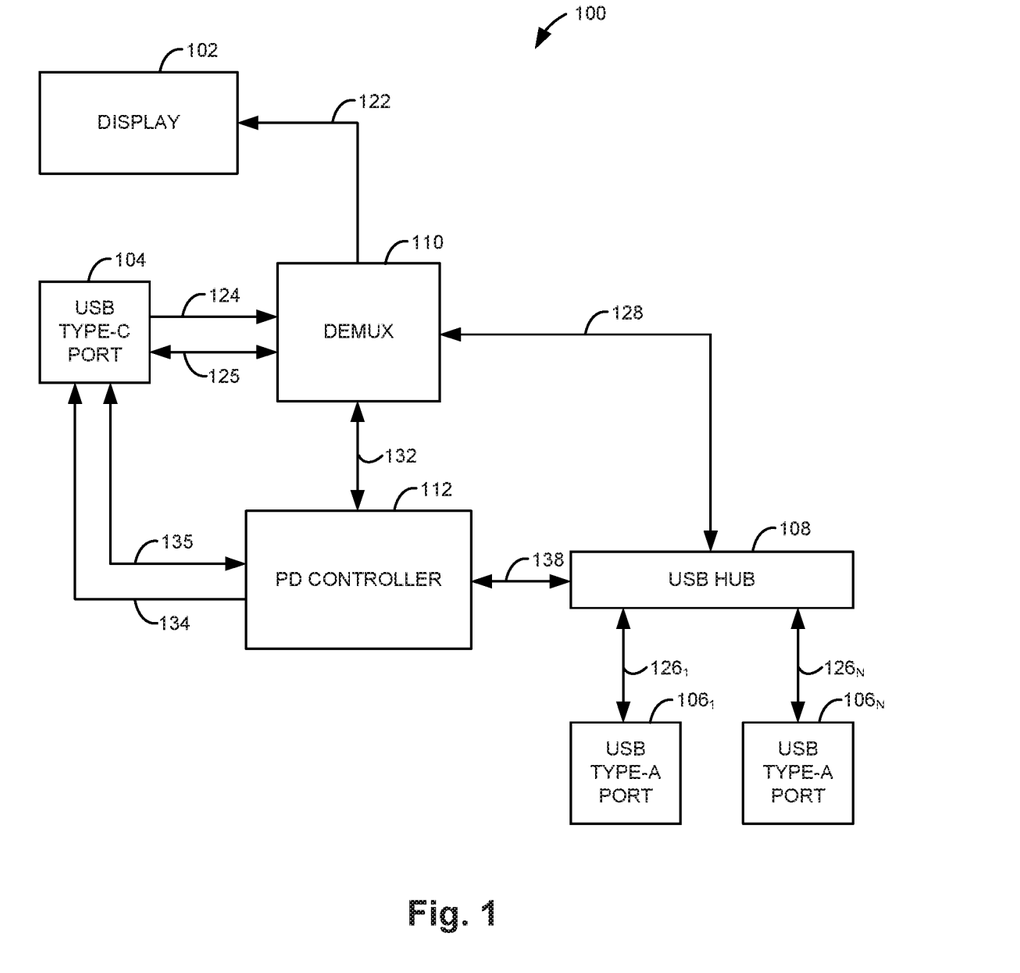
FIG. 1 is a block diagram illustrating one example of an All-In-One (AIO) computer.

FIG. 1 is a block diagram illustrating one example of an AIO computer 100. AIO computer 100 includes a display 102, a USB Type-C port 104, and a plurality of USB Type-A ports 106₁ to 106N, where "N" is any suitable number of USB Type-A ports (e.g., 2-4 ports). AIO computer 100 also includes a USB hub 108, a demultiplexer 110, and a Power Delivery (PD) controller 112. The USB hub 108 is communicatively coupled to each of the plurality of USB Type-A ports 106₁ to 106N through communication paths 126₁ to 126N, respectively. The demultiplexer 110 is communicatively coupled to the display 102 through a communication path 122, the USB Type-C port 104 through communication paths 124 and 125, and the USB hub 108 through a communication path 128. The PD controller 112 is communicatively coupled to the demultiplexer 110 through a communication path 132, the USB Type-C port 104 through communication paths 134 and 135, and the USB hub 108 through a communication path 138.

The display 102 may include a liquid crystal display or another suitable display. In one example, the communication path 122 is a DisplayPort interface or another suitable interface for passing a display signal from the demultiplexer 110 to the display 102. In one example, the communication path 124 is a DisplayPort interface for passing a display signal from the USB Type-C port 104 to the demultiplexer 110. In one example, the communications paths 126₁ to 126N are USB interfaces for passing USB signals between each of the plurality of USB Type-A ports 106₁ to 106N and the USB hub 108. In addition, in one example, the communication path 128 and the communication path 125 are also USB interfaces for passing USB signals between the USB hub 108 and the USB Type-C port 104.

The PD controller 112 controls the demultiplexer 110 and the USB hub 108 to pass a display signal input to the USB Type-C port 104 to the display 102 and pass signals input to the USB hub 108 from the plurality of USB Type-A ports 106₁ to 106N to the USB Type-C port 104 with a computing device coupled to the USB Type-C port 104. In one example, the PD controller 112 detects the computing device when the computing device is coupled to the USB Type-C port 104. The computing device may include a computer, a tablet, a cellular phone, or another suitable computing device. In one example, the PD controller 112 is coupled to the USB Type-C port 104 via a VBUS signal path 134 and configuration channel (e.g., CC1/CC2) signal paths 135. In this example, the PD controller 112 may supply power to the USB Type-C port 104 through VBUS 134 and detect when a computing device is connected to the USB Type-C port 104 through the configuration channel signal paths 135.

In one example, the PD controller 112 is coupled to the demultiplexer 110 through a first I2C interface 132 and to the USB hub 108 through a second I2C interface 138. The PD controller 112 controls the states of the demultiplexer 110 and the USB hub 108 via control signals passed through the first I2C interface 132 and the second I2C interface 138, respectively. The PD controller 112 selectively controls demultiplexer 110 to connect the DisplayPort interface 124 to the DisplayPort interface 122 in response to a computing device being connected to the USB Type-C port 104. In this way, a display signal from the computing device connected to the USB Type-C port 104 is displayed on the display 102. The PD controller 112 also selectively controls the demultiplexer 110 and the USB hub 108 to connect the USB interface 125 to the USB interface 128 in response to a computing device being connected to the USB Type-C port 104. In this way, input/output devices (e.g., keyboard, mouse, etc.) connected to the USB Type-A ports 1061 to 106N may provide input/output for the computing device connected to the USB Type-C port 104.

Figure 2:
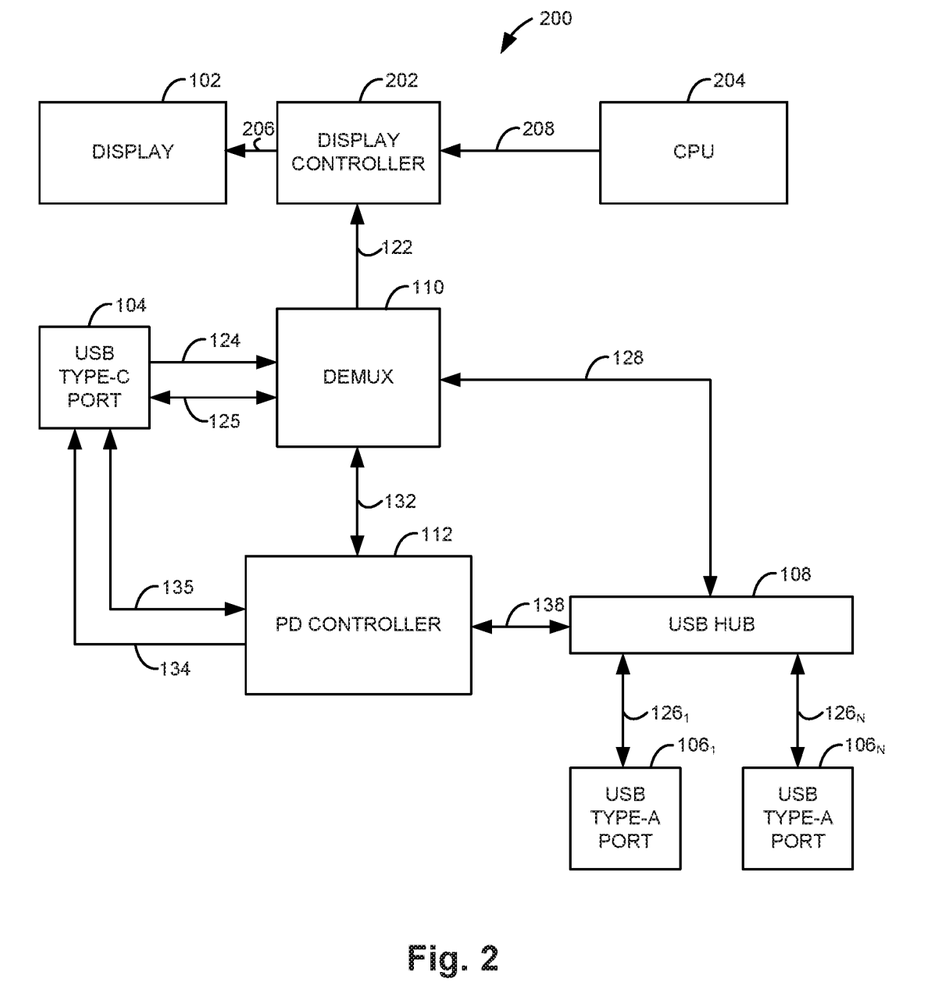
FIG. 2 is a block diagram illustrating another example of an AIO computer.

FIG. 2 is a block diagram illustrating another example of an AIO computer 200. AIO computer 200 is similar to AIO computer 100 previously described and illustrated with reference to FIG. 1, except that AIO computer 200 includes a display controller 202 and a Central Processing Unit (CPU) 204. The display controller 202 is communicatively coupled to the demultiplexer 110 through the communication path 122 and to the display 102 through a communication path 206. The CPU 204 is communicatively coupled to the display controller 202 through a communication path 208. In one example, display controller 202 is communicatively coupled to the demultiplexer 110 through the DisplayPort interface 122 and communicatively coupled to the display 102 through a Low-Voltage Differential Signaling (LVDS) interface 206. In one example, the CPU 204 is communicatively coupled to the display controller 202 through a DisplayPort interface 208.

The display controller 202 controls the display 102 by converting a display signal (e.g., a DisplayPort signal) to a signal suitable for controlling display 102 (e.g., a LVDS signal). The CPU 204 controls the processing operations of the AIO computer 200. Display controller 202 passes the display signal input to the USB Type-C port 104 to the display 102 with the CPU 204 in a sleep state (e.g., a low power state) and a display signal from the CPU 204 to the display 102 with the CPU 204 in a working state (e.g., a full power state). In one example, display controller 202 is controlled by PD controller 112 to selectively pass the display signal input to the USB Type-C port 104 to the display 102.

Figure 3:
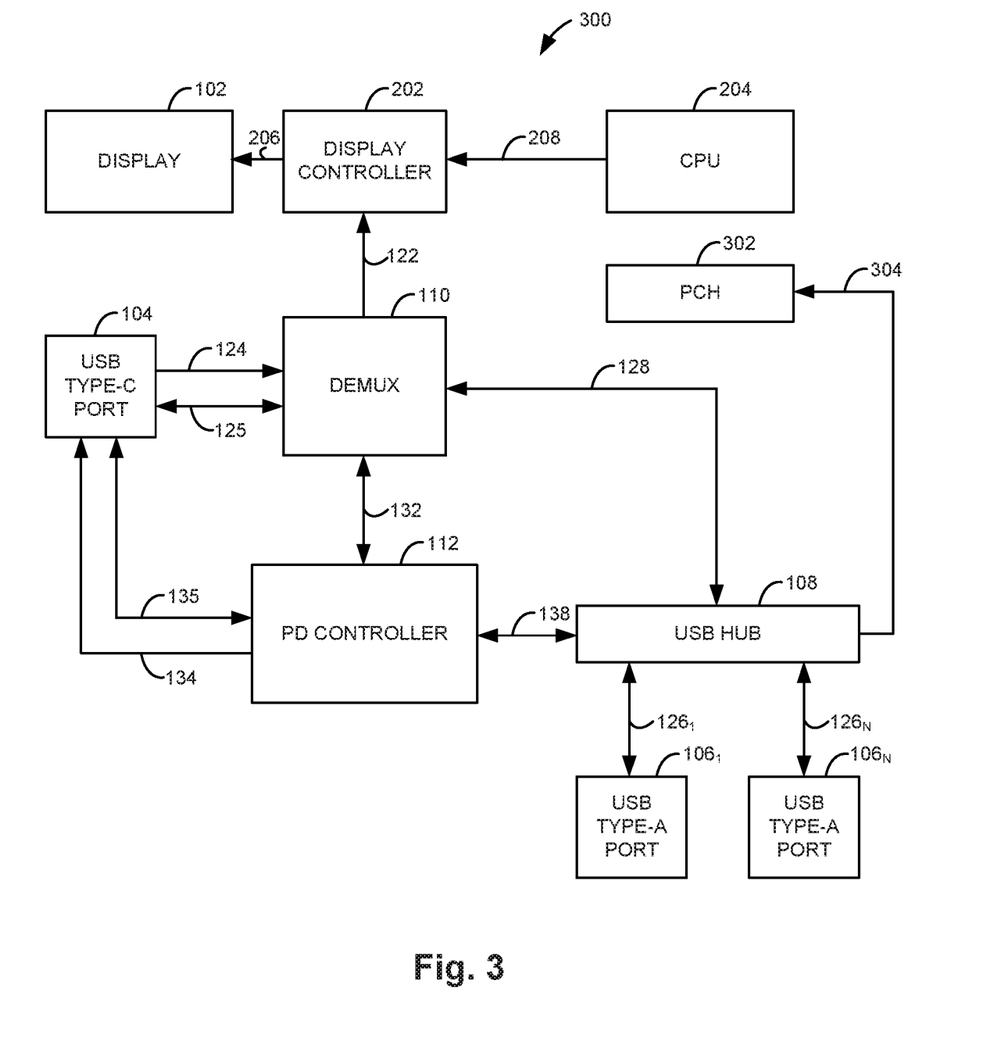
FIG. 3 is a block diagram illustrating another example of an AIO computer.

FIG. 3 is a block diagram illustrating another example of an AIO computer 300. AIO computer 300 is similar to AIO computer 200 previously described and illustrated with reference to FIG. 2, except that AIO computer 300 includes a Platform Controller Hub (PCH) 302. The PCH 302 is communicatively coupled to the USB hub 108 through a communication path 304. In one example, the communication path 304 is a USB interface to pass USB signals between the PCH 302 and the USB hub 108. The PCH 302 may control certain data paths and support functions of the AIO computer 300 and is used in conjunction with the CPU 204.

The USB hub 108 passes the signals input to the USB hub from the USB Type-A ports 1061 to 106N to the USB Type-C port 104 with the PCH 302 in a sleep state (e.g., a low power state) and to the PCH 302 with the PCH in a working state (e.g., a full power state). In one example, the USB hub 108 is controlled by the PD controller 112 to selectively pass the USB signals from the USB Type-A ports 1061 to 106N to either demultiplexer 110 through the USB interface 128 or to the PCH 302 through the USB interface 304.

Figure 4:
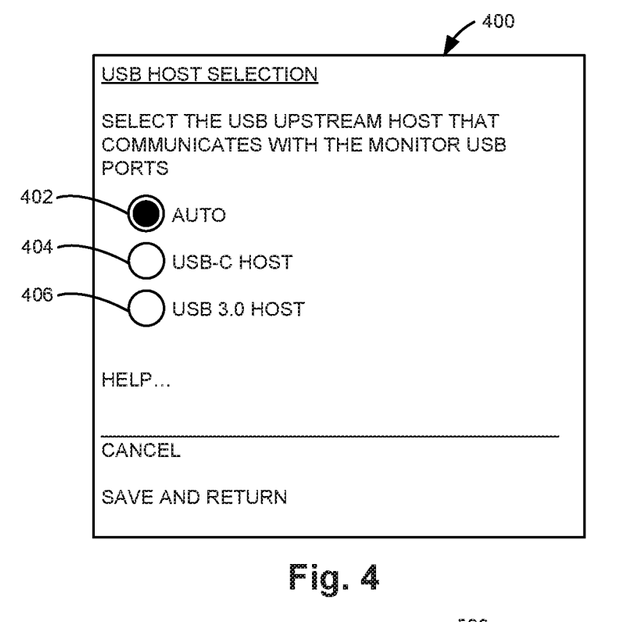
FIG. 4 is a diagram illustrating one example of an on screen display menu.

FIG. 4 is a diagram illustrating one example of an on screen display menu 400. The PD controller 112 may initiate the on screen display menu 400 on the display 102 for selecting a USB host mode in response to detecting a computing device connected to the USB Type-C port 104. In one example, the PD controller 112 initiates the on screen display menu 400 via the display controller 202. The on screen display menu 400 may include an auto option 402, a USB-C host option 404, and a USB 3.0 host option 406. The on screen display menu 400 may also include a help function, a cancel function, and a save and return function.

In response to the auto option 402 being selected (which is indicated in FIG. 4), the USB upstream host is automatically selected based on the USB upstream host that is connected first. For example, if the AIO computer's CPU 204 and PCH 302 are in a working state, the USB Type-A ports 1061 to 106N communicate with the CPU 204 and PCH 302 even if a computing device is subsequently connected to the USB Type-C port 104. If the AIO computer's CPU 204 and PCH 302 are in a sleep state or transition to a sleep state and a computing device is connected to the USB Type-C port 104, the USB Type-A ports 1061 to 106N communicate with the computing device. If the first host drops the connection, then the next active host is selected.

In response to the USB-C host option 404 being selected, the USB Type-C port (and host) is the active stream (e.g., the computing device coupled to the USB Type-C port 104 communicates with the USB Type-A ports 1061 to 106N). In response to the USB 3.0 host option 406 being selected, the USB 3.0 port (and host) is the active stream (e.g., the AIO computer's CPU 204 and PCH 302 communicates with the USB Type-A ports 1061 to 106N). In one example, the on screen display menu 400 may provide a warning message prior to switching between USB upstream ports to prevent data loss. In this case, the on screen display menu 400 may also include a confirmation selection for the user to confirm the change prior to switching between USB upstream ports. In response to a selection of an option in the on screen display menu 400, the display controller 202 may pass an indication of the selection to the PD controller 112 (e.g., by toggling a General-Purpose Input/Output (GPIO) pin of the PD controller 112) to implement the selection.

Figure 5:
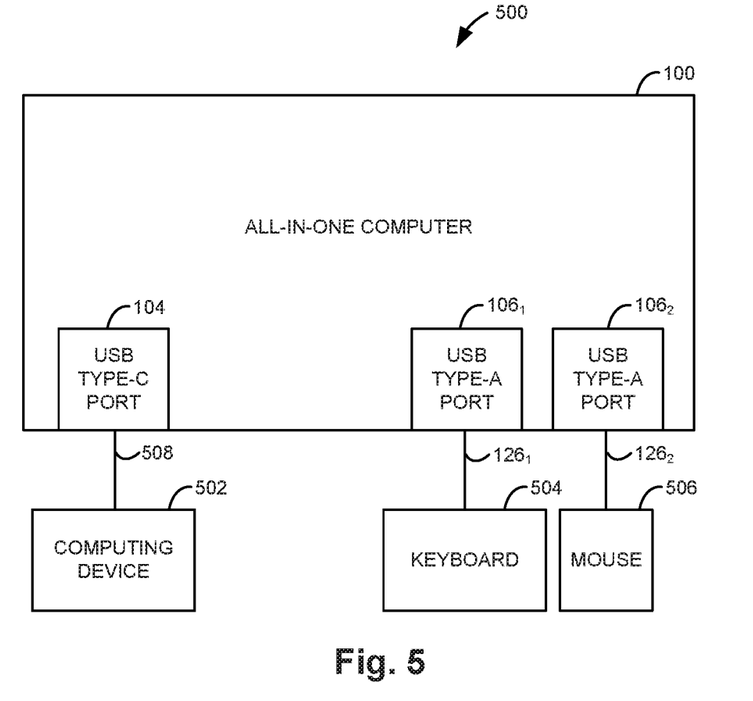
FIG. 5 is a block diagram illustrating one example of a system including an AIO computer.

FIG. 5 is a block diagram illustrating one example of a system 500 including an AIO computer 100 as previously described and illustrated with reference to FIG. 1. In other examples, system 500 includes an AIO computer 200 as previously described and illustrated with reference to FIG. 2 or an AIO computer 300 as previously described and illustrated with reference to FIG. 3. System 500 also includes a computing device 502, a keyboard 504, and a mouse 506. The computing device 502 is communicatively coupled to the USB Type-C port 104 through a communication path 508. The computing device 502 may be a computer, a tablet, a cellular phone, or another suitable computing device. The keyboard 504 is communicatively coupled to a first USB Type-A port 1061 through a communication path 1261. The mouse 506 is communicatively coupled to a second USB Type-A port 1062 through a communication path 1262. In other examples, other input and/or output devices may be coupled to the USB Type-A port 1061 and 1062.

With the computing device 502 connected to the USB-Type C port 104, the display 102 of the AIO computer 100 may be controlled by the computing device 502. In addition, the keyboard 504 and the mouse 506 may be used to control the computing device 502. The AIO computer 100 may provide a larger or a second display for the computing device 502. The keyboard 504 may provide a keyboard for a computing device that does not include a keyboard (e.g., for a tablet or cellular phone) or a larger or more ergonomic keyboard (e.g., for a notebook computer) for the computing device 502. The mouse 506 may provide a mouse for a computing device that does not include a mouse (e.g., for a tablet or cellular phone) or a larger or more ergonomic mouse (e.g., for a notebook computer) for the computing device 502. In this way, the versatility of AIO computer 100 is improved compared to an AIO computer in which a computing device 502 cannot utilize the USB Type-A ports 106₁ to 106N.

Figure 6A:
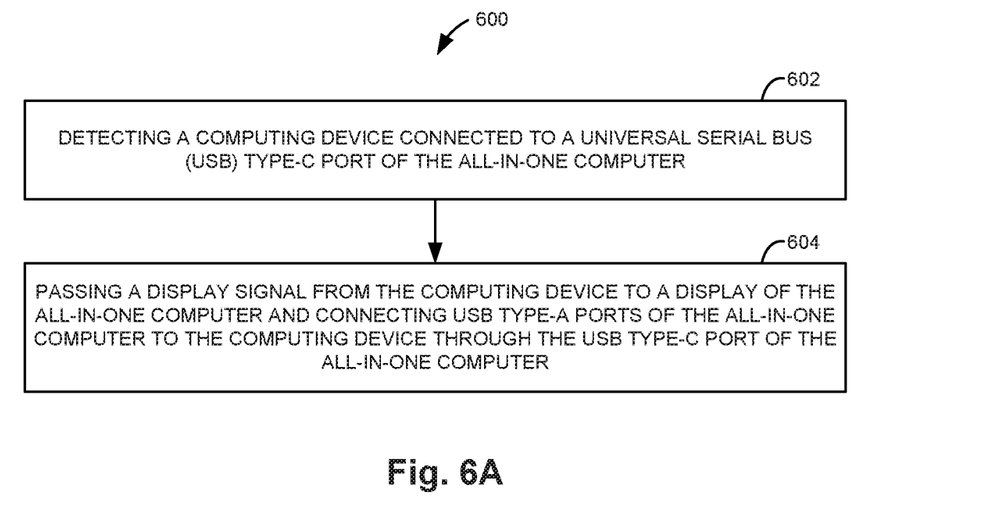
FIGS. 6A and 6B are flow diagrams illustrating one example of a method for utilizing an AIO computer.
Figure 6B:
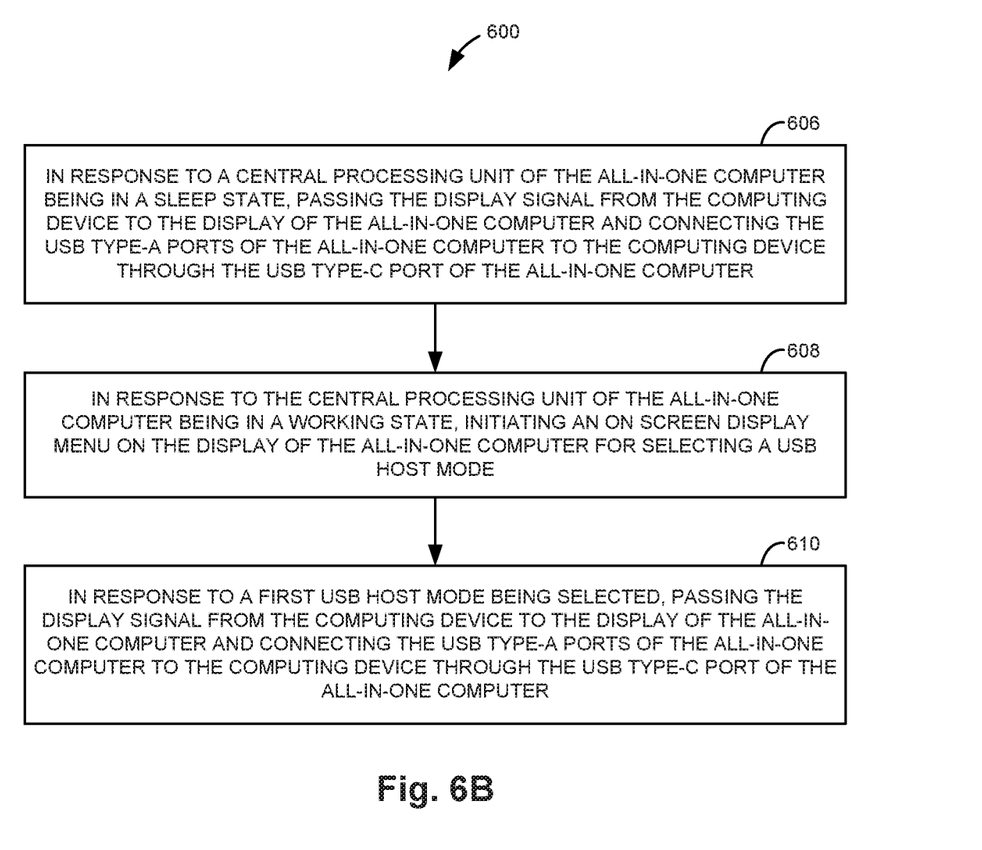

FIGS. 6A and 6B are flow diagrams illustrating one example of a method 600 for utilizing an AIO computer, such as AIO computer 100, 200, or 300 previously described and illustrated with reference to FIGS. 1-3, respectively. As illustrated in FIG. 6A at 602, method 600 includes detecting a computing device connected to a Universal serial Bus (USB) Type-C port of the all-in-one computer. For example, as illustrated in FIG. 5, a computing device 502 may be detected by the AIO computer 100 when the computing device 502 is connected to the USB Type-C port 104 through the communication path 508.

At 604, method 600 includes passing a display signal from the computing device to a display of the all-in-one computer and connecting USB Type-A ports of the all-in-one computer to the computing device through the USB Type-C port of the all-in-one computer. For example, as illustrated in FIGS. 1 and 5, demultiplexer 110 may pass a display signal from the computing device 502 to the display 102 and connect the USB Type-A ports 106₁ to 106N to the computing device 502 through the USB Type-C port 104.

As illustrated in FIG. 6B at 606, method 600 may further include in response to a central processing unit of the all-in-one computer being in a sleep state, passing the display signal from the computing device to the display of the all-in-one computer and connecting the USB Type-A ports of the all-in-one computer to the computing device through the USB Type-C port of the all-in-one computer. For example, as illustrated in FIGS. 2 and 5, in response to the central processing unit 204 being in a sleep state, passing the display signal from the computing device 502 to the display 102 and connecting the USB Type-A ports 106₁ to 106N to the computing device 502 through the USB Type-C port 104.

At 608, method 600 may further include in response to the central processing unit of the all-in-one computer being in a working state, initiating an on screen display menu on the display of the all-in-one computer for selecting a USB host mode. For example, as illustrated in FIGS. 2, 4, and 5, in response to the central processing unit 204 being in a working state, initiating the on screen display menu 400 for selecting a USB host mode.

At 610, method 600 may further include in response to a first USB host mode being selected, passing the display signal from the computing device to the display of the all-in-one computer and connecting the USB Type-A ports of the all-in-one computer to the computing device through the USB Type-C port of the all-in-one computer. For example, as illustrated in FIGS. 2, 4, and 5, in response to the USB-C host option 404 being selected, passing the display signal from the computing device 502 to the display 102 and connecting the USB Type-A ports 106₁ to 106N to the computing device 502 through the USB Type-C port 104.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. An all-in-one computer comprising:
a display;
a Universal Serial Bus (USB) Type-C port;
a plurality of USB Type-A ports;
a USB hub coupled to the plurality of USB Type-A ports;
a demultiplexer coupled between the display, the USB Type-C port, and the USB hub; and
a Power Delivery (PD) controller to control the demultiplexer and the USB hub to pass a display signal input to the USB Type-C port to the display and pass signals input to the USB hub from the plurality of USB Type-A ports to the USB Type-C port with a computing device coupled to the USB Type-C port;
wherein the PD controller is configured to detect the computing device when the computing device is coupled to the USB Type-C port; and
wherein the PD controller is configured to initiate an on screen display menu on the display for selecting a USB host mode in response to detecting the computing device.

2. The all-in-one computer of claim 1, further comprising:
a display controller coupled between the demultiplexer and the display; and
a central processing unit coupled to the display controller, wherein the display controller passes the display signal input to the USB Type-C port to the display with the central processing unit in a sleep state and a display signal from the central processing unit to the display with the central processing unit in a working state.

3. The all-in-one computer of claim 1, further comprising:
a platform controller hub coupled to the USB hub,
wherein the USB hub passes the signals input to the USB hub from the USB Type-A ports to the USB Type-C port with the platform controller hub in a sleep state and to the platform controller hub with the platform controller hub in a working state.

4. The all-in-one computer of claim 1, wherein the PD controller receives a selection signal in response to the selected USB host mode.

5. The all-in-one computer of claim 1, wherein the computing device comprises a computer, a tablet, or a cellular phone.

6. The all-in-one computer of claim 1, further comprising:
a keyboard coupled to a first USB Type-A port of the plurality of USB Type-A ports; and
a mouse coupled to a second USB Type-A port of the plurality of USB Type-A ports.

7. An all-in-one computer comprising:
a display;
a central processing unit;
a display controller coupled between the display and the central processing unit;
a Universal Serial Bus (USB) Type-C port;
a plurality of USB Type-A ports;
a USB hub coupled to the plurality of USB Type-A ports;
a demultiplexer coupled between the display controller, the USB Type-C port, and the USB hub; and
a Power Delivery (PD) controller to control the demultiplexer and the USB hub to pass a display signal input to the USB Type-C port to the display controller and pass USB signals transmitted via the USB hub from the plurality of USB Type-A ports to the USB Type-C port with a computing device coupled to the USB Type-C port;

wherein the PD controller is configured to detect the computing device when the computing device is coupled to the USB Type-C port; and wherein the PD controller is configured to initiate an on screen display menu on the display for selecting a USB host mode in response to detecting the computing device.

8. The all-in-one computer of claim 7, wherein the PD controller is coupled to the demultiplexer through a first I2C interface and to the USB hub through a second I2C interface.

9. The all-in-one computer of claim 7, wherein the PD controller is coupled to the USB Type-C port through a VBUS signal path and configuration channel signal paths.

10. The all-in-one computer of claim 7, wherein the USB Type-C port is coupled to the demultiplexer through a DisplayPort interface and a USB interface.

11. The all-in-one computer of claim 7, wherein the computing device comprises a computer, a tablet, or a cellular phone.

12. A method for utilizing an all-in-one computer, the method comprising:

detecting a computing device connected to a universal serial bus (USB) Type-C port of the all-in-one computer;

passing a display signal from the computing device to a display of the all-in-one computer and connecting USB Type-A ports of the all-in-one computer to the computing device through the USB Type-C port of the all-in-one computer, in response to a central processing unit of the all-in-one computer being in a sleep state, passing the display signal from the computing device to the display of the all-in-one computer and connecting the USB Type-A ports of the all-in-one computer to the computing device through the USB Type-C port of the all-in-one computer;

in response to the central processing unit of the all-in-one computer being in a working state, initiating an on screen display menu on the display of the all-in-one computer for selecting a USB host mode; and in response to a first USB host mode being selected, passing the display signal from the computing device to the display of the all-in-one computer and connecting the USB Type-A ports of the all-in-one computer to the computing device through the USB Type-C port of the all-in-one computer.

* * * * *